US007366246B2

(12) United States Patent
Walker et al.

(10) Patent No.: US 7,366,246 B2
(45) Date of Patent: Apr. 29, 2008

(54) METHOD TO MAXIMIZE RECEIVER PERFORMANCE IN A MULTI-STREAM SYSTEM

(75) Inventors: Glenn A. Walker, Greentown, IN (US); J. Robert Dockemeyer, Jr., Kokomo, IN (US); Eric A. Dibiaso, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 689 days.

(21) Appl. No.: 10/731,570

(22) Filed: Dec. 9, 2003

(65) Prior Publication Data

US 2005/0123076 A1 Jun. 9, 2005

(51) Int. Cl.
*H04L 5/12* (2006.01)
*H04L 23/02* (2006.01)

(52) U.S. Cl. ...................... 375/262; 375/340; 375/341; 715/705; 715/786; 715/796

(58) Field of Classification Search ........ 375/340–341, 375/346, 349; 714/705, 786, 796; 370/315
See application file for complete search history.

(56) References Cited

U.S. PATENT DOCUMENTS 5,881,057 A * 3/1999 Komatsu .................... 370/335
5,937,016 A * 8/1999 Choi .......................... 375/341
6,944,139 B1 * 9/2005 Campanella ................ 370/315

* cited by examiner

*Primary Examiner*—Curtis B. Odom
(74) *Attorney, Agent, or Firm*—Jimmy L. Funke

(57) ABSTRACT

A receiver includes a channel decoder select circuit, a plurality of communication channels, at least one maximum ratio combiner circuit, and a forward error correction circuit. The plurality of communication channels receive wireless information from channel demodulators and are in communication with respective channel decoder circuits, which are in communication with the channel decoder select circuit. The at least one maximum ratio combiner circuit receives the wireless information from the plurality of communication channels. The output of the maximum ratio combiner is communicated to the forward error correction circuit, the output of which is communicated to the channel decoder select circuit. A pseudo bit error measurement feedback signal communicated to the maximum ratio combiner from one of the plurality of channel decoder circuits. A method for finding wireless satellite signals that minimizes errors in a receiver system is also disclosed.

16 Claims, 4 Drawing Sheets

METHOD TO MAXIMIZE RECEIVER PERFORMANCE IN A MULTI-STREAM SYSTEM

TECHNICAL FIELD

The present invention generally relates to receivers and, more particularly, to a satellite-based digital audio radio receiver that finds wireless satellite signals and minimizes errors in the receiver system.

BACKGROUND OF THE INVENTION

Automotive vehicles are commonly equipped with audio radios for receiving broadcast radio frequency (RF) signals, processing the RF signals, and broadcasting audio information to passengers in the vehicle. More recently, satellite digital audio radio (SDAR) services have become available. SDAR services offer digital radio service covering a large geographic area, such as North America. Satellite-based digital audio radio services are available in North America, which generally employ either geo-stationary orbit satellites or highly elliptical orbit satellites that receive up-linked programming which, in turn, is rebroadcast directly to digital radios in vehicles on the ground that subscribe to the service. These systems also use terrestrial repeater networks in urban areas to supplement the availability of service. Each vehicle subscribing to the digital service generally includes a digital radio having a receiver and one or more antennas for receiving the digital broadcast.

The radio receivers are programmed to receive and unscramble the digital data signals, which typically include many channels of digital audio. In addition to broadcasting the encoded digital quality audio signals, the satellite-based digital audio radio service may also transmit data within a data bandwidth that may be used for various applications. The broadcast signal may also include other information for reasons such as advertising, informing the driver of warranty issues, providing information about the broadcast audio information, and providing news, sports, and entertainment broadcasting. Accordingly, the digital broadcast may be employed for any of a number of satellite audio radio, satellite television, satellite Internet, and various other consumer services.

In some systems with more than one signal source (i.e. multi-stream systems) and different data sources (i.e. same data with different signal sources), there is a need to find signal(s), such as, for example, wireless satellite signals, that maximizes performance of a receiver by minimizing errors in the receiver system, which results in an improved user experience. As illustrated in FIG. 1, traditional satellite-based digital audio radio services receivers 1*a* typically include multiple forward error correction (FEC) circuits that receive terrestrial and satellite signals provided over a terrestrial and satellite channel, respectively, to detect which communication path does not have an error, such as a burst-type error (i.e. where the signal to noise ratio is temporarily degraded). A form of FEC, which is known in the art as 'concatenated coding,' combines a convolutional code and a block code, which results in a code that has an inner code and an outer code.

As illustrated in FIG. 2, other known satellite-based digital audio radio services using more than one signal (or antenna), comprises a receiver 1*b* including a maximum ratio combiner (MRC) that combines the satellite and terrestrial channel signals. Typically, an MRC receives and aligns two signals in time or phase, weights (magnitude adjusted) signals according to a quality criteria, which results in an improved signal magnitude upon being combined together. For example, the MRC can be thought of as adding a desired signal coherently (i.e. in phase) and adding noise non-coherently (i.e. random noise where phase is unknown) such that the signal will double in voltage (i.e. a 6 dB increase). Because noise is typically non-coherent for each source, the noise will, over some time, add at a square root of two (i.e. a 3 dB increase). Since the desired signal is increased by 6 dB and the noise is increased by 3 dB, the result is a net 3 dB increase in the signal to noise ratio. Accordingly, an MRC provides an improved system performance.

The advantage of the system seen in FIG. 1, which uses multiple FEC circuits for each frequency or antenna source, is a direct selection of the frequency or antenna source that does not have any errors. By using multiple FEC algorithms, the best signal path having the least amount of bit errors carrying the RF signal from the antenna to the FEC hardware may be chosen for the source decoder. On the other hand, as seen in FIG. 2, the use of an MRC circuit prior to an FEC circuit optimally combines phase- and time-aligned signals to improve coded signal performance in a digital communication system. Essentially, the advantage of implementing an MRC circuit prior to the FEC circuit allows the receiver to obtain better performance in low signal to thermal noise (SNR) environments, such as additive white Gaussian noise (AWGN) environments.

Although adequate for most situations, there are situations where the undistorted channels are combined with distorted channels, which produces a distorted input to the FEC algorithm. The combination of a distorted signal (that has a good quality measurement) and an undistorted signal may degrade the system performance. Thus, the FEC algorithm may be undesirably corrupted by the bad signal, which produces an output error, such as an audio mute in an SDAR system. In this situation, the receiver may actually use corrupted signals that appear to be in a usable condition. For example, a terrestrial signal, which may be typically corrupted more so than satellite signals, is then passed through the MRC into the FEC, which outputs an error, where, conversely, if only the satellite signal was used, no error would have occurred. Accordingly, it is therefore desirable to provide a satellite-based digital audio radio receiver that finds wireless satellite signals and minimizes errors in the receiver system to improve the overall system performance such that undesirable errors, such as audio mutes, do not occur.

SUMMARY OF THE INVENTION

The present invention relates to a receiver. Accordingly, one embodiment of the invention is directed to a receiver that includes a channel decoder select circuit, a plurality of communication channels, at least one maximum ratio combiner circuit, and a forward error correction circuit. The plurality of communication channels receives wireless information from channel demodulators and are in communication with respective channel decoder circuits, which are in communication with the channel decoder select circuit. The at least one maximum ratio combiner circuit receives the wireless information from the plurality of communication channels. The output of the maximum ratio combiner is communicated to the forward error correction circuit, the output of which is communicated to the channel decoder select circuit. A pseudo bit error measurement feedback signal communicated to the maximum ratio combiner from one of the plurality of channel decoder circuits.

Another embodiment of the invention is directed to a receiver that includes first and second wireless signals provided from respective first and second satellite channel demodulators, and a third wireless signal provided from a terrestrial channel demodulator. First, second, and third pseudo bit error measurement signals corresponding to the first, second, and third wireless signals are communicated to a maximum ratio combiner, and a Reed-Solomon decoder processes the output of the maximum ratio combiner.

A method for finding wireless satellite signals that minimizes errors in a receiver system is also disclosed.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
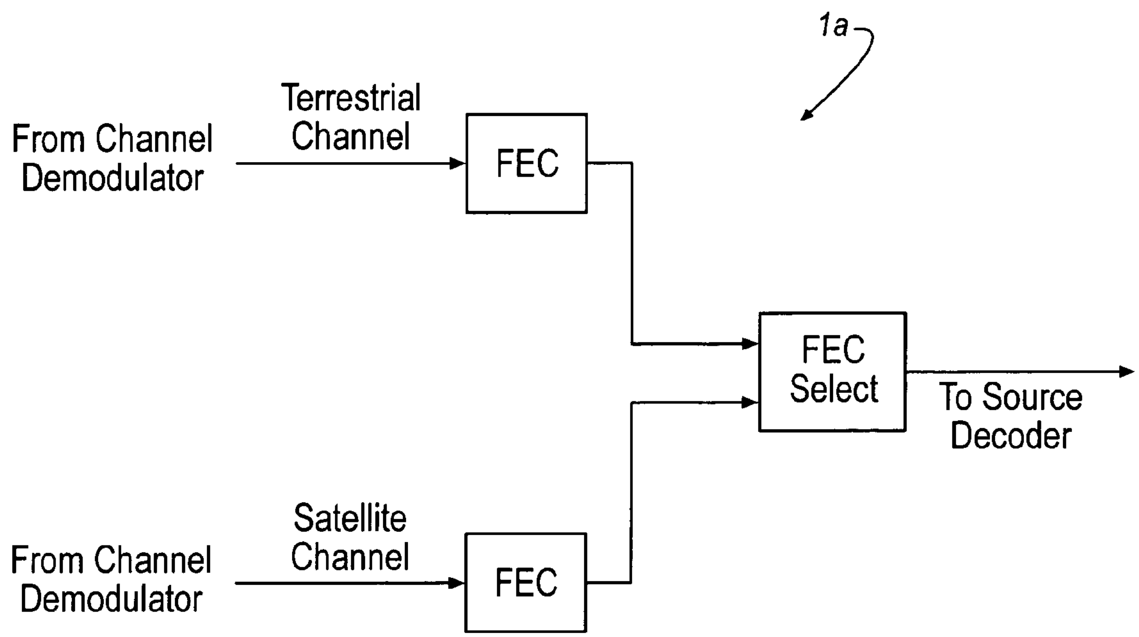
FIG. 1 illustrates a known satellite-based digital audio radio services receiver.
Figure 2:
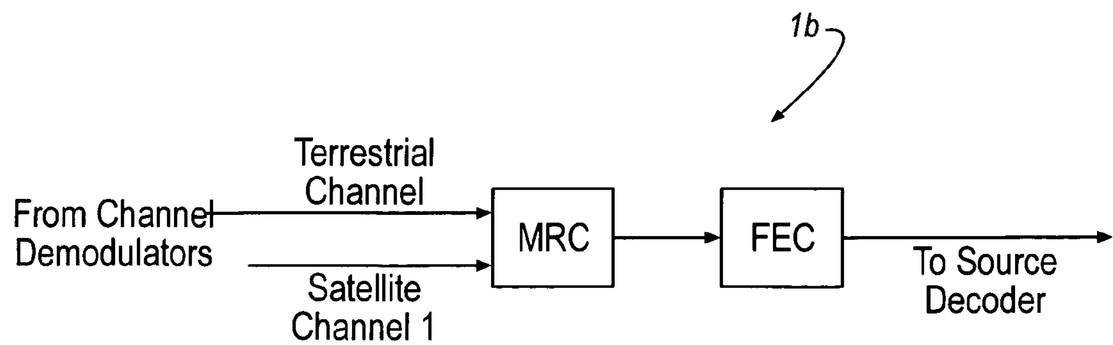
FIG. 2 illustrates another known satellite-based digital audio radio services receiver.
Figure 3:
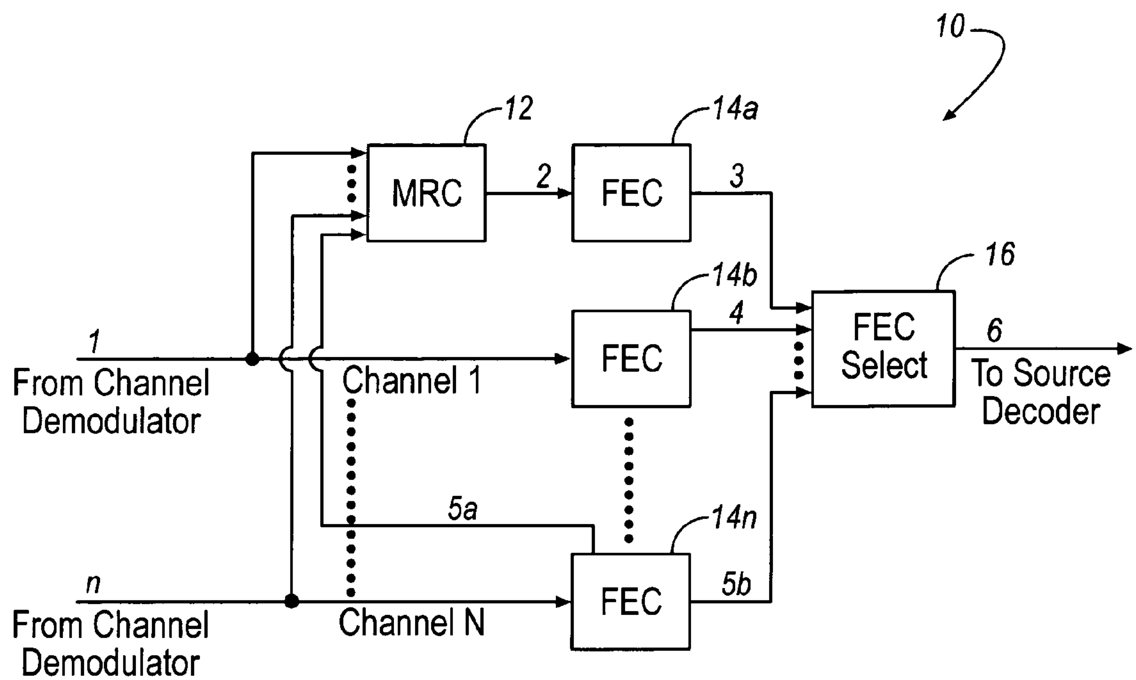
FIG. 3 illustrates a satellite-based digital audio radio services receiver according to one embodiment of the invention.

The above described disadvantages are overcome and a number of advantages are realized by the inventive receivers that are illustrated in FIGS. 3-6. As illustrated in FIG. 3, a receiver 10 includes a plurality of communication channels, which are labeled Channel 1 through Channel N. Channels 1 through N receive information from channel demodulators and are each input into an MRC 12, whose output is communicated to FEC 14*a* over line 2. Channels 1 through N are also each input to respective FEC circuits 14*b*, 14*n*. Feedback from the FEC circuit 14*n* is communicated over line 5*a* to the MRC 12, which is explained in greater detail below. The output of the FECs 14*a*, 14*b*, 14*n* (i.e. channel decoder circuits) is communicated to an FEC Select circuit 16 (i.e. channel decoder select circuit) over lines 3, 4, 5*b*, respectively. The FEC select circuit 16 outputs the FEC path that contains the minimum number of decoded errors. The minimum error output of the FEC Select circuit 16 is communicated over line 6 to a source decoder that converts the data to audio.

Communication Channels 1 through N may carry any desirable signal. According to one embodiment of the invention, if the receiver 10 is a satellite digital audio radio services (SDARS) receiver, two, three or four channels may be implemented in a design that includes multiple FEC circuits to receive satellite and terrestrial signals. For example, Channel 1-3 may carry satellite signals and Channel 4 may carry terrestrial signals. If desired, an additional MRC circuit may be implemented in the design of the receiver 10 such that one MRC processes (i.e. adds) terrestrial and satellite signals communicated over multiple channels and the second MRC processes (i.e. adds) only satellite signals communicated over other multiple channels. Essentially, the receiver 10 takes advantage of both the MRC and FEC signal switching methods such that multiple FECs are being processed and the FEC circuit having the best output is selected by the FEC Select 16. The FEC path, which is seen over communication lines 2, 3 that includes the MRC circuit 12, may be selected when the receiver 10 encounters a weak SNR environment and provides the channel decoder extra small signal performance (i.e. small signal to noise performance) to ensure that a strong corrupted signal (i.e. a signal having a signal to interference ratio) does not contaminate the channel decoder output, which results in a cross-mute.

In operation, the FEC circuits 14*a*-14*n* may be 'time sliced.' Essentially, the FEC circuits 14*a*-14*n* can share the same hardware (circuits) and process each path during a specific time interval. All of the channels may appear to carry a usable signal, however, corrupted signals may be detected quicker by phasing-out the MRC circuit 12, thus providing the best signal for the source decoder. Without the additional FEC processing, undetected corrupted signals cause system degradation. The additional FEC circuits 14*a*-14*n* essentially act as independent error correction devices in the receiver 10 such that when a corrupted signal is used in the MRC, the receiver 10 is able to detect an error and switch to a FEC circuit that is processing satellite signals.

The FEC circuit 14*n* also provides pseudo-bit error measurement feedback to the MRC 12. According to one possible implementation of the receiver system, Channel N, which communicates with the FEC circuit 14*n* and the MRC 12, may carry the terrestrial signal. When received in cities, the terrestrial signal typically encounters multipath conditions, which can lead to inter-symbol-interference. This phenomenon can also cause the received terrestrial signal to appear strong. Strong signals may become corrupted via the inter-symbol-interference when a far away repeater is seen by the antenna and a near repeater is blocked. The far away repeater may be on a different multi-carrier-modulation (MCM) symbol, Orthogonal Frequency Division Multiplexing (OFDM) symbol, or coded OFDM (COFDM) symbol than the near repeater, which results in the corrupted signal or error. The actual signal level may be sufficient signal to noise, but the environment has corrupted the signal information before it reaches the antenna. If the terrestrial signal is corrupted, the receiver detects the corrupted signal and provides feedback over line 5*a* so that the combined terrestrial and satellite signal is not used by the source decoder. Thus, the use of the FEC circuits 14*b* through 14*n* allows the receiver 10 to quickly detect when one signal is corrupted, and if neither signal is corrupted, the MRC 12 does not get phased out.

Figure 4:
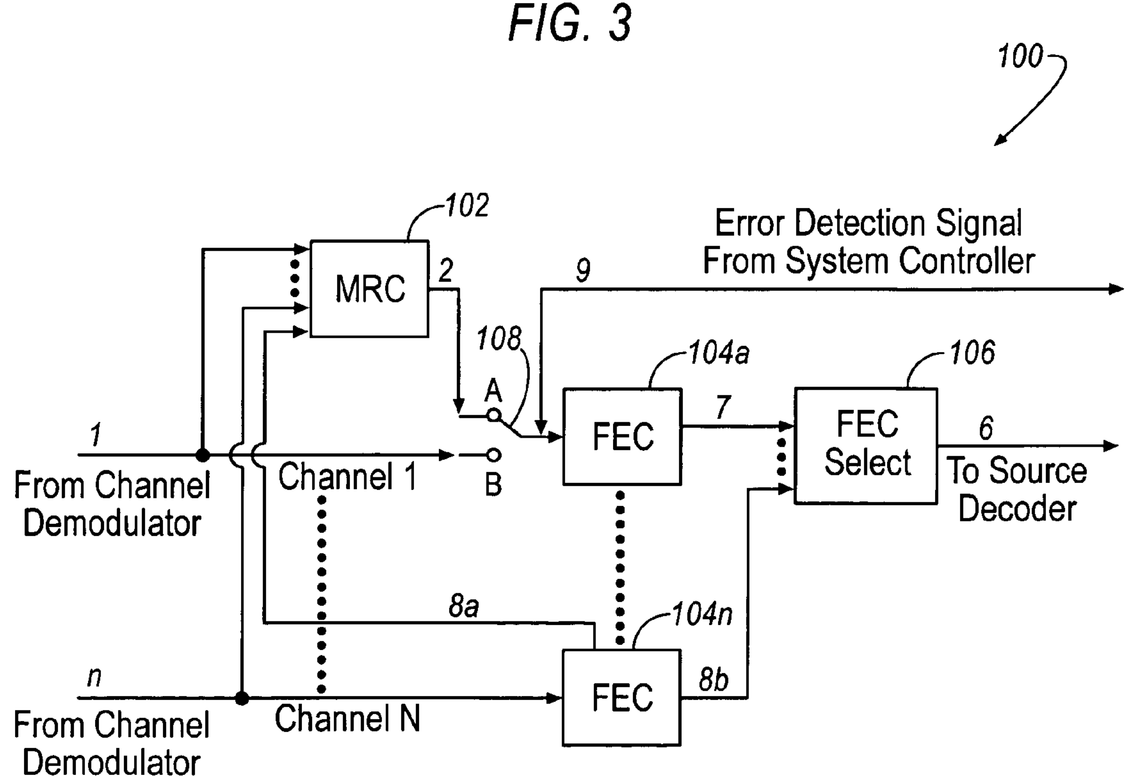
FIG. 4 illustrates a satellite-based digital audio radio services receiver according to another embodiment of the invention.

Referring now to FIG. 4, another embodiment of the receiver is seen generally at 100. The receiver 100 also includes a plurality of communication channels, which are labeled Channel 1 through Channel N. In this embodiment, Channel N is directly input to an FEC 104*n* while Channel 1 is input to an FEC 104*a* via a switch 108. Channels 1 though N are also input into an MRC circuit 102 whose output also communicates over line 2 with the FEC 104*a* via the switch 108. Similar to the operation of the receiver 10 described above, feedback from the FEC circuit 104*n* is communicated over line 8*a* to the MRC 102. The FEC 104*a* also receives a feedback signal over line 9, which is labeled "Error Detection Signal From System Controller." More specifically, the feedback signal may be an uncorrectable error detection signal from the Reed Solomon Decoder. The bit error may arise from a corrupted terrestrial signal, a corrupted satellite signal, or even a combination of usable signals that when added together, results in an error. The output of the FECs 104*a*, 104*n* (i.e. channel decoder circuits) is communicated to an FEC Select circuit 106 (i.e. channel decoder select circuit) over lines 7, 8*b* respectively. The output of the FEC Select circuit 106 is communicated over line 6 to the source decoder that converts the data to audio.

Functionally, the MRC circuit 102 of the receiver 100 is disabled when the signal levels from Channels 1 through N are strong, and conversely, the MRC circuit 102 may be activated when the signal levels from Channels 1 through N are weak. Accordingly, some protection is provided against a strong corrupted signal dominating the input of the MRC circuit 102 and FECs 104*a*, 104*n*. The receiver 100 may be able to estimate the strength of the received corrupted signal relative to the noise floor since narrow band power detection may be available to the system microcontroller.

In this embodiment, the switch 108 may be adjusted based on the terrestrial and satellite power level seen by the receiver. For example, Channel 1 may carry the satellite signal and Channel N may carry the terrestrial signal. In this scenario, the receiver 100 may just look at the terrestrial and satellite signals independently by positioning the switch 108 at position B to monitor each signal on the respective FEC circuits 104*a*, 104*n*. Conversely, the terrestrial and satellite signals maybe combined and monitored by positioning the switch 108 to position A such that the receiver sees the output from the MRC 102 at line 2. Thus, signal processing time may be saved because one less FEC block is implemented (in view of FIG. 3), however, additional hardware is needed to enable the receiver 100 to choose whether or not the MRC circuit 102 is to be used. Even further, the receiver 100 is less complex than the receiver 10 (because there aren't as many FECs) while also providing channel decoding enhancements. Essentially, the switch 108 acts as a blind switch because the receiver 100 does not look for all error possibilities simultaneously, whereas the receiver 10 does.

Essentially, if all of the received signals from the Channels are sufficiently strong in the signal noise estimation, then the receiver 100 operates by just using the FECs 104*a*, 104*n* without the MRC 102, because, if the signals are good to begin with, there is no need to use the MRC 102. Accordingly, the receiver 100 keeps track of the occurrence of a bad signal (e.g. a corrupted terrestrial signal) input to an FEC. Conversely, if a weak signal is present, then the receiver 100 takes advantage of the MRC circuit 102 because the corrupted signal may not be some type of interference, but rather, noise.

Figure 5:
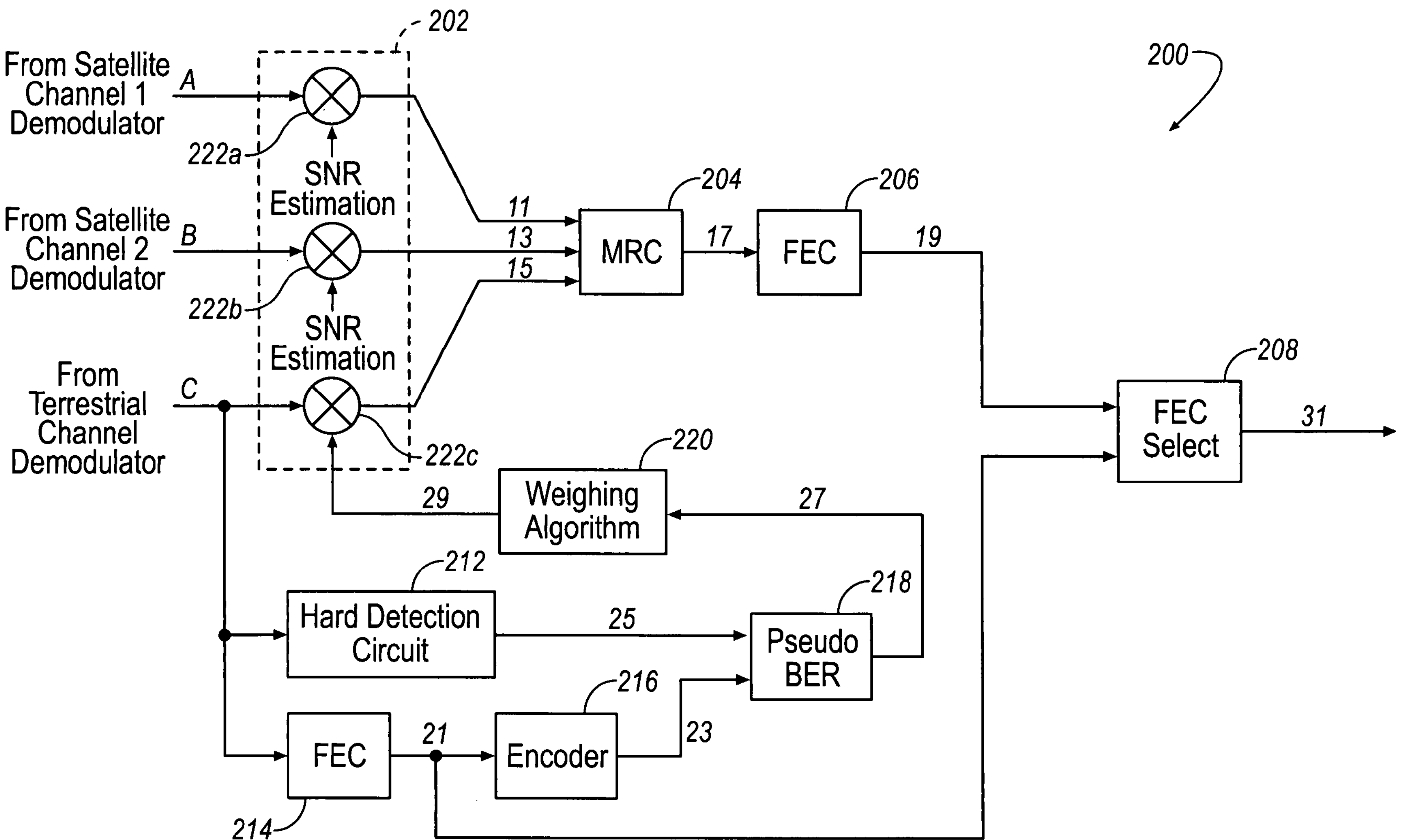
FIG. 5 illustrates a satellite-based digital audio radio services receiver according to another embodiment of the invention.

Referring now to FIG. 5, another embodiment of the receiver is seen generally at 200. The receiver 200 also includes a plurality of communication channels, which are labeled A, B, and C. Communication channels A and B receive information from Satellite Channel Demodulators 1 and 2, respectively, whereas, communication channel C receives information from a Terrestrial Channel Demodulator. As illustrated, communication channels A, B, C are directly fed into an MRC weighting block, which is seen generally at 202, the output of which is communicated to an MRC 204 over lines 11, 13, 15. The output of the MRC 204 is communicated over line 17 to an FEC circuit 206, the output of which is communicated over line 19 to an FEC Select circuit 208.

In this embodiment, communication channel C, which carries the terrestrial signal, is split three ways. The first split enters the MRC weighting block 202, the second split enters a hard detection circuit 212, and the third split enters an FEC circuit 214. The output of the FEC circuit 214 is communicated to an encoder 216 and to the FEC Select circuit 208 over line 21. The output of the encoder 216 is communicated to a pseudo bit error rate (BER) circuit 218 over line 23, which also receives the output of the hard detection circuit 212 over line 25. The output of the pseudo BER circuit 218 is communicated over 27 to a weighting algorithm 220, the output of which is communicated over line 29 to the MRC weighting block 202.

The receiver 200 permits weighting of a multi-carrier OFDM or COFDM signal, such as the terrestrial signal, into the MRC circuit 204 by using a pseudo bit error rate of the FEC circuit 214. The FEC circuit 214 receives information over communication channel C in the form of soft bits (i.e. 0.50 or 0.25 are considered soft bits, whereas 1 or 0 are considered hard bits). In an SDARS implementation associated with the illustrated receiver 200, the FEC circuit 214, which may comprise a Viterbi or Turbo decoder, decodes soft bits and outputs hard bits, which are subsequently re-encoded by the encoder 216 into hard bits. Assuming that the output of the FEC circuit 214 is truth data (i.e. a corrected, decoded signal), the encoder 216 outputs hard bits that correspond to a corrected signal. The received transmitted signal from communication channel C is simultaneously processed by the hard detection circuit 212, which produces a hard bit of the original terrestrial signal. The hard decision output and FEC corrected data output seen at lines 23, 25 is compared by the pseudo BER circuit 218. As illustrated, the weighting algorithm 220 receives the output of the pseudo BER circuit 218. The weighting algorithm may comprise a look-up table or other non-linear control, and is based upon the number of estimated errors for uncorrected bit error rates.

The MRC weighting block 202 receives the output from the weighting algorithm 220 at a weighting amplifier 222*c*. Two additional weighting amplifiers 222*a*, 222*b* process an SNR estimation and the information received from Satellite Channels 1 and 2 over communication lines A and B, respectively. The SNR estimation may be based on the power level into the receiver 200, which may be signal power or noise power. The SNR estimation may also include a straight power detection where noise is assumed at some level, a correlation measurement where some known data signal is auto-correlated and compared to noise, or an examination at the carrier tracking loop (i.e. a noisy loop indicates a lower signal to noise ratio). The output of each weighting amplifier 222*a*-222*c* is communicated to the MRC circuit 204. Functionally, the output of the MRC 204, FEC 206, and FEC 214 that is communicated into the FEC Select 208 behaves in a similar fashion as described above with respect to the receivers 10, 100.

Figure 6:
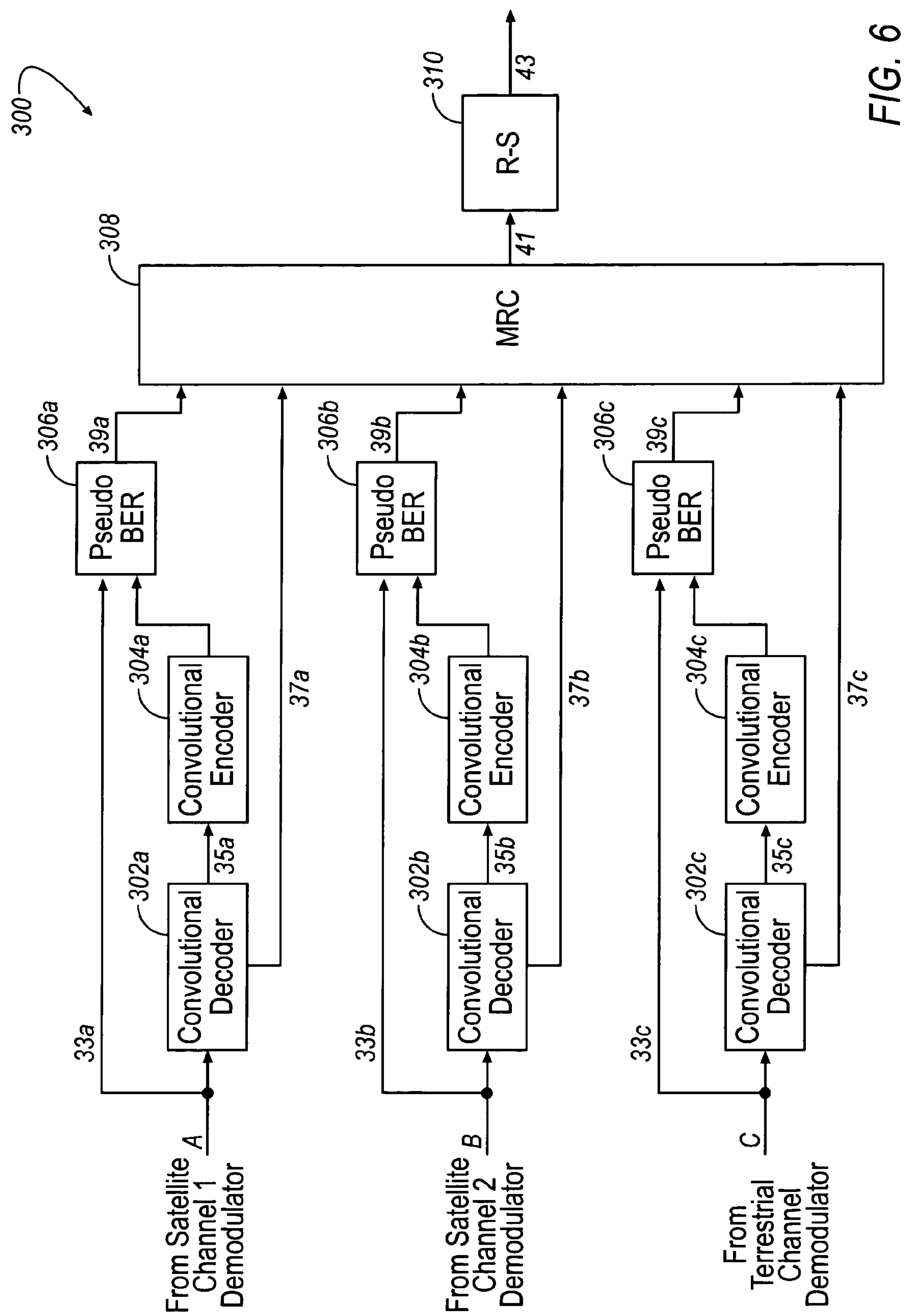
FIG. 6 illustrates a satellite-based digital audio radio services receiver according to another embodiment of the invention.

Referring now to FIG. 6, another embodiment of the receiver is seen generally at 300. The receiver 300 also includes a plurality of communication channels, which are labeled A, B, and C. Communication channels A and B receive information from Satellite Channel Demodulators 1 and 2, respectively, whereas, communication channel C receives information from the Terrestrial Channel Demodulator. Similar to the receiver 200, the receiver 300 provides a pseudo-bit error measurement prior to processing at the MRC circuit 308. As illustrated, communication channels A, B, C are directly fed into convolutional decoders 302*a*-302*c* and Pseudo BER circuits 306*a*-306*c* over communication lines 33*a*-33*c*, respectively. The output of the convolutional decoders 302*a*-302*c* are communicated to convolutional encoders 304*a*-304*c* over lines 35*a*-35*c*, and an MRC circuit 308 over communication lines 37*a*-37*c*, respectively. The output of the convolutional encoders 304*a*-304*c* are communicated to the Pseudo BER circuits 306*a*-306*c*. The output of the Pseudo BER circuits 306*a*-306*c* is also communicated to the MRC circuit 308 over lines 39*a*-39*c*. The output of the MRC circuit is communicated over line 41 to a Reed-Solomon decoder 310, the output of which is communicated over line 43.

In this embodiment, the elements comprising an FEC circuit is split between the MRC circuit 308. The FEC circuit typically includes a convolutional decoder, seen at elements 302*a*-302*c*, and a Reed-Solomon decoder, seen at element 310. In the illustrated SDARS-related implementation, the convolutional decoder 302*a*-302*c* may be Viterbi or Turbo decoders, which produces the inner code of a concatenated code. The Reed-Solomon decoder, on the other hand, produces the outer code of a concatenated code. As illustrated, the convolutional decoder 302*a*-302*c*, convolutional encoder 304*a*-304*c*, and pseudo BER 306*a*-306*c* each provide the MRC circuit 308 with an approximated bit error rate on the inner code and the Reed Solomon detector 310 provides improved signal to noise estimates based on the bit error rates.

Accordingly, by 'splitting the FEC circuit,' the number of Reed-Solomon circuits is reduced to one unit that serves a plurality of convolutional decoders, which also reduces the number of computations carried out in the associated software. The output of the Reed-Solomon circuit 310 is time-division multiplexed such that the source decoder may acquire the desired data aligned in a specific time-slot. Although not illustrated, the MRC circuit 308 includes the weighting algorithm which can be carried out by a multiplier in an application specific integrated circuit (ASIC), based on the SNR to ensure that a good signal is not degraded by the noise of a bad signal.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A receiver, comprising:

a channel decoder select circuit;

a plurality of communication channels that receives wireless information from channel demodulators, said plurality of communication channels in communication with respective channel decoder circuits, said plurality of channel decoder circuits in communication with the channel decoder select circuit;

at least one maximum ratio combiner circuit that receives the wireless information from the plurality of communication channels, wherein the output of the maximum ratio combiner is communicated to a forward error correction circuit, the output of which is communicated to the channel decoder select circuit;

a pseudo bit error measurement feedback signal communicated to the maximum ratio combiner from one of the plurality of channel decoder circuits; and a switch connected at the input of the forward error correction circuit that switches between the output of the maximum ratio combiner circuit and a first communication channel of the plurality of communication channels.

2. The receiver according to claim 1, wherein the plurality of channel decoder circuits are forward error correction circuits.

3. The receiver according to claim 1, wherein the channel decoder select circuit is a forward error correction select circuit.

4. The receiver according to claim 3, wherein the output of the forward error correction select circuit is communicated to a source decoder that converts the wireless information to audio.

5. The receiver according to claim 1, wherein the wireless information is a satellite digital audio radio services signal and a terrestrial signal.

6. The receiver according to claim 1, further comprising a feedback signal communicated to the input of the first channel decoder circuit.

7. The receiver according to claim 6, wherein the feedback signal is an uncorrectable error detection signal from a Reed Solomon Decoder.

8. A receiver comprising:

a channel decoder select circuit;

a plurality of communication channels that receives wireless information from channel demodulators;

at least one maximum ratio combiner circuit that receives the wireless information from the plurality of communication channels, wherein the output of the maximum ratio combiner is communicated to a forward error correction circuit, the output of which is communicated to the channel decoder select circuit; and a pseudo bit error measurement feedback signal communicated to the maximum ratio combiner;

wherein at least one of the wireless signals received by the plurality of communication channels is processed by a forward error correction circuit, an encoder, a hard detection circuit, a pseudo bit error rate circuit, and a weighting algorithm.

9. The receiver according to claim 8, wherein the maximum ratio combiner includes a weighting algorithm executed by a multiplier.

10. A method for finding wireless satellite signals that minimizes errors in a receiver system, comprising the steps of:

providing a plurality of signals from a plurality of channel demodulators;

receiving the plurality of signals at an input of a maximum ratio combiner;

combining said plurality of signals to generate an output signal from the maximum ratio combiner such that the output signal of the maximum ratio combiner is communicable with an input of a first forward error correction circuit;

receiving at least a first signal from the plurality of signals from a first communication channel of the plurality of channels at the an input of at least a second forward error correction circuit;

providing an output signal from at least the first forward error correction circuit and the at least a second forward error correction circuit to a forward error correction select circuit, wherein said forward error correction select circuit determines an output signal that contains a minimum number of decoded errors;

developing a pseudo bit error measurement feedback signal; and providing the pseudo bit error measurement feedback signal communicated to the maximum ratio combiner from the second forward error correction circuit.

11. The method according to claim 10 further comprising the step of providing a switch at the input of the first forward error correction circuit.

12. The method according to claim 11 further comprising the step of switching between the output of the maximum ratio combiner and the at least a first signal.

13. A receiver, comprising:

a plurality of convolutional decoders in communication with respective convolutional encoders, said convolutional decoders being configured to receive wireless signals;

a plurality of pseudo bit error circuits in communication with said plurality of convolutional encoders and configured to receive said wireless signals;

a maximum ratio combiner configured to receive output signals from each of said plurality of convolutional decoders and each of said plurality of pseudo bit error circuits; and a reed-solomon decoder configured to process the output of the maximum ratio combiner.

14. The receiver of claim 13, wherein said wireless signals include a satellite signal and a terrestrial signal.

15. A receiver, comprising:

a plurality of communication channels configured to receive wireless signals;

at least one maximum ratio combiner circuit in communication with a forward error correction circuit, the output of which is communicated to a channel decoder select circuit; and a plurality of channel decoder circuits in communication with said channel decoder select circuit; wherein at least one of said plurality of channel decoder circuits is configured to provide a pseudo bit error measurement feedback signal to said maximum ratio combiner circuit;

wherein said at least one maximum ratio combiner circuit is configured to receive said wireless signals from each of said plurality of communication channels and wherein said each of the plurality of channel decoder circuits are configured to receive said wireless signals from each of said plurality of communication channels.

16. The receiver of claim 15, wherein said wireless signals include at least one satellite signal and a terrestrial signal.

* * * * *